United States Patent
Carder et al.

[15] 3,655,076
[45] Apr. 11, 1972

[54] CARGO HANDLING

[72] Inventors: Frank B. Carder, Darien; Warren R. Stumpe, Stamford; Bruno S. Frassetto, Westport; Charles H. Bell, New Canaan, all of Conn.

[73] Assignee: Dorr-Oliver Incorporated, Stamford, Conn.

[22] Filed: Apr. 13, 1970

[21] Appl. No.: 32,478

Related U.S. Application Data

[62] Division of Ser. No. 655,227, July 21, 1967, Pat. No. 3,506,144.

[52] U.S. Cl.....................................................214/38 BA
[51] Int. Cl.........................................................B65g 67/10
[58] Field of Search..........................214/38 B, 38 D, 84, 512

[56] References Cited

UNITED STATES PATENTS 3,263,832   8/1966   Williams et al. .....................214/84 X
3,075,659   1/1963   Sylvester et al. .....................214/38 B Primary Examiner—Robert G. Sheridan
Attorney—Burtsell J. Kearns and Theodore M. Jablon

[57] ABSTRACT

An air cargo pallet handling technique utilizing a mobile aircraft loader, pallet dollies having unpowered pallet transfer surfaces, and a dolly-maneuvering tractor having a hitch for side coupling with the dollies, the loader having a powered extractor to operate the transfer surface of a dolly positioned at the loader.

3 Claims, 6 Drawing Figures

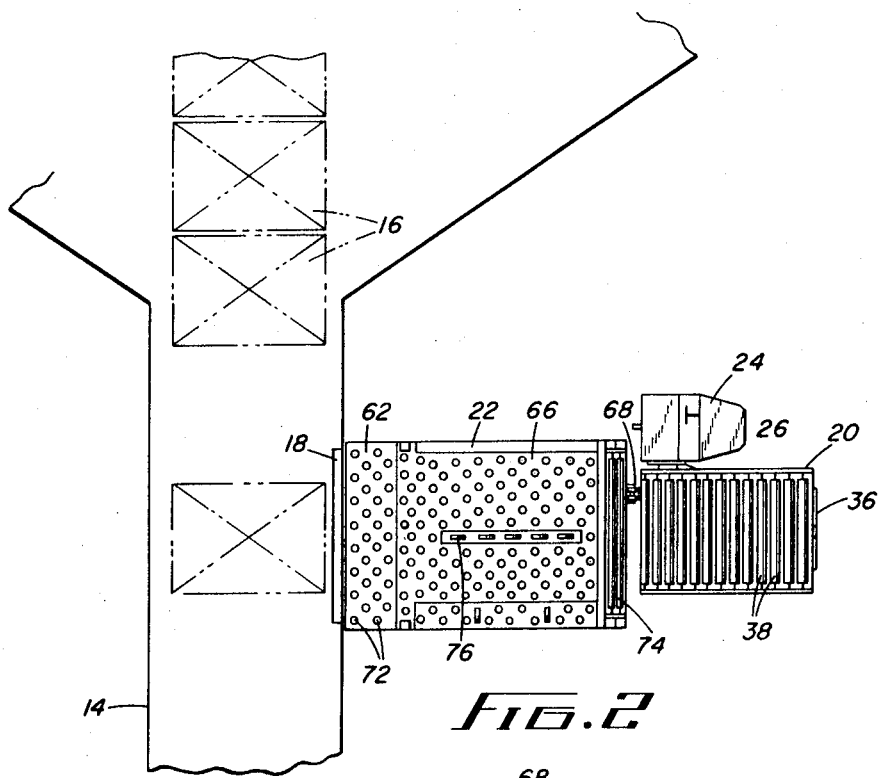
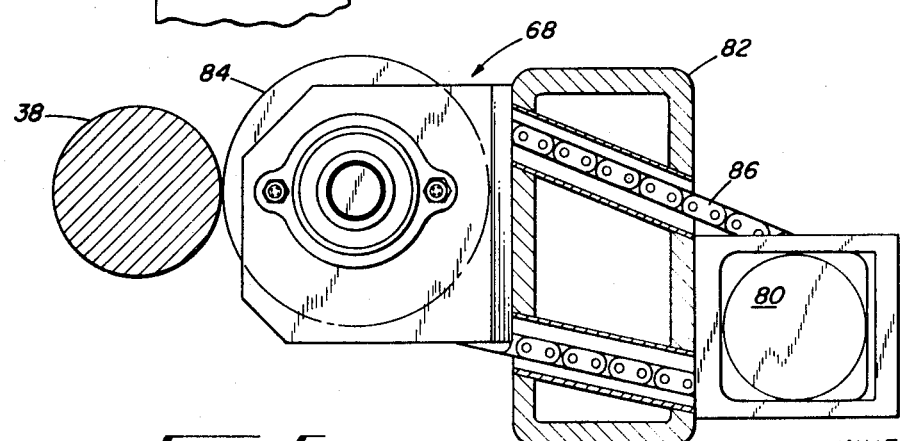

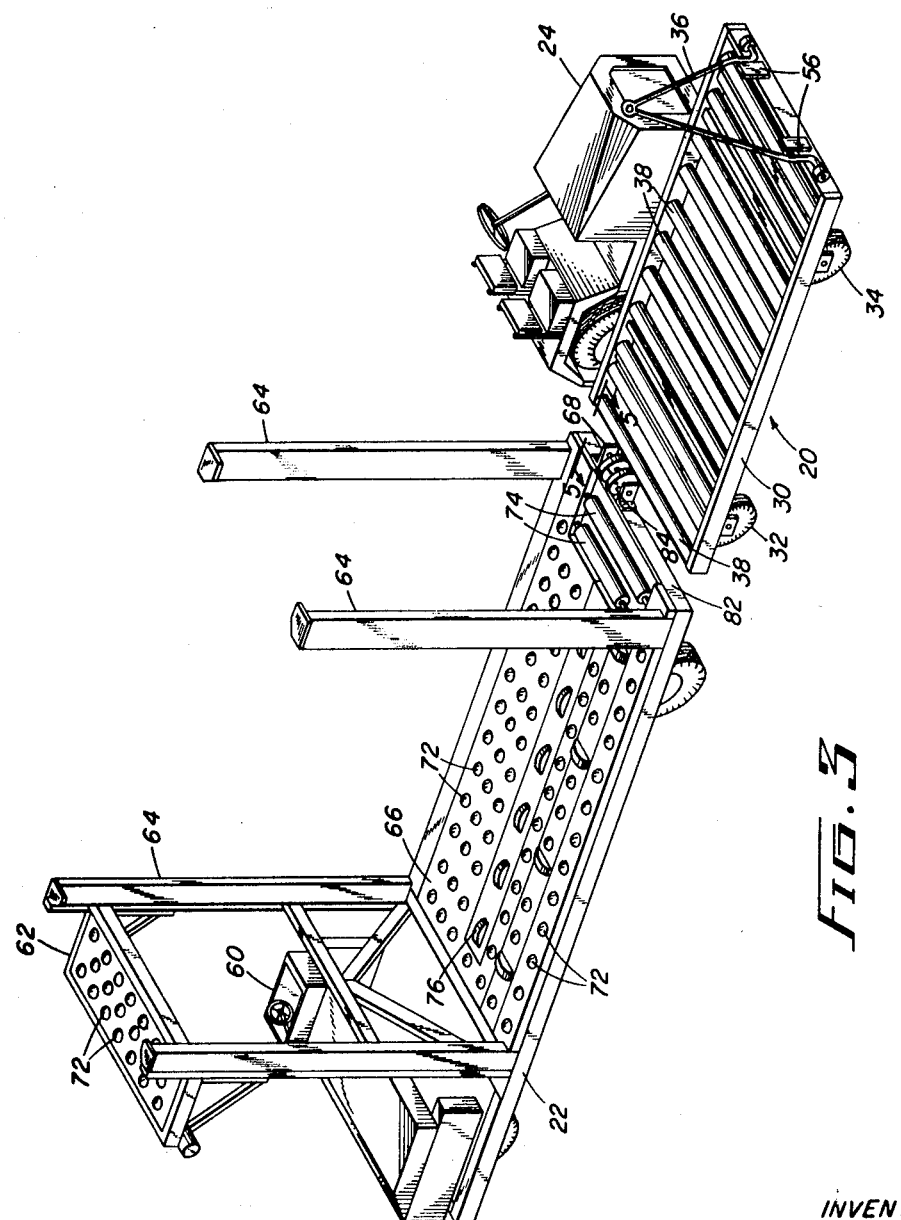

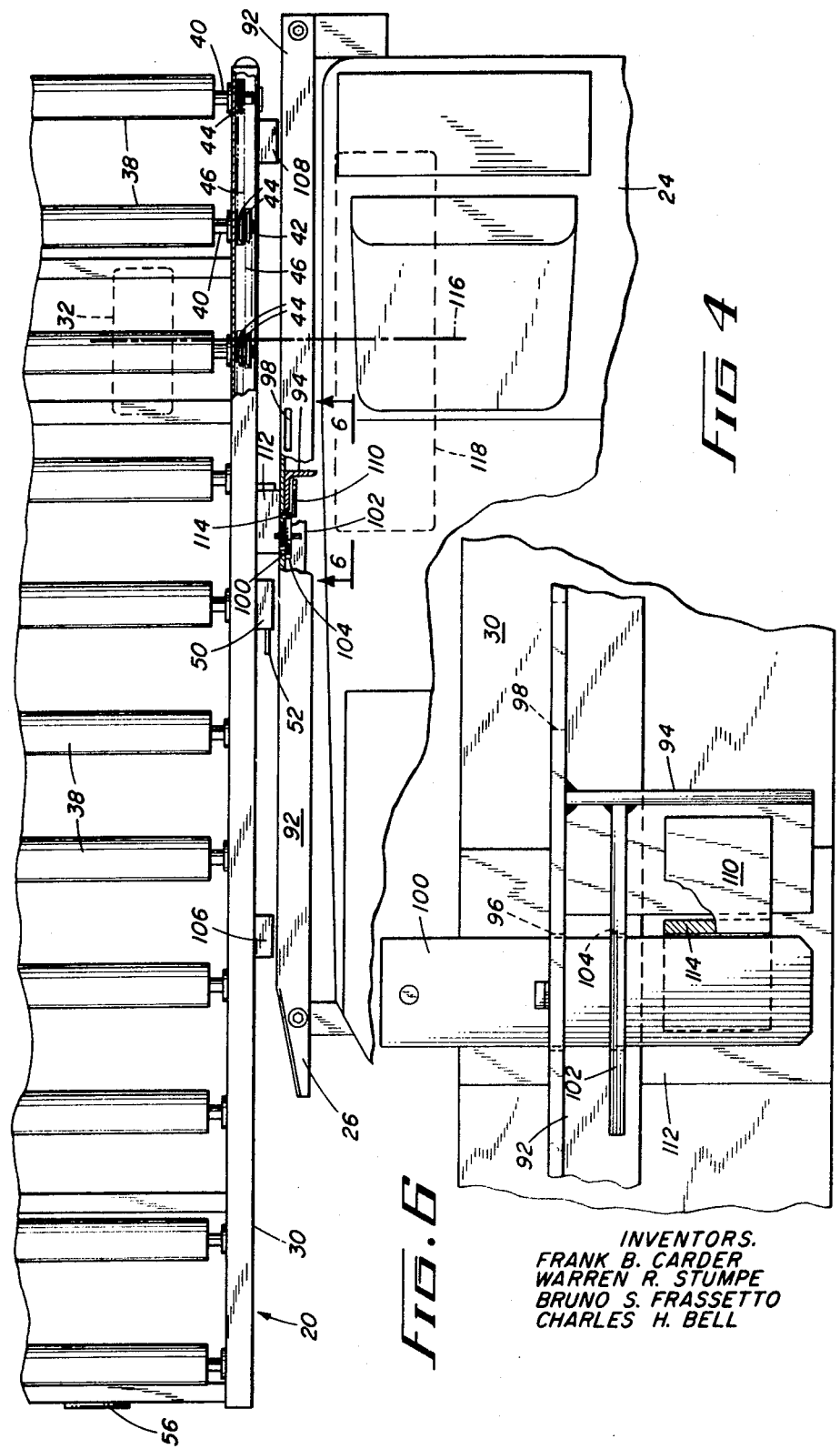

CARGO HANDLING

CROSS-REFERENCES TO RELATED APPLICATIONS

This application is a division of application Ser. No. 655,227, filed July 21, 1967, now U.S. Pat. No. 3,506,144, issued Apr. 14, 1970.

BACKGROUND OF THE INVENTION

It is conventional in air cargo operations to assemble cargo on pallets which may be on the order of 8 by 10 feet. One conventional type of pallet is relatively thin and flexible so as to reduce the pallet weight and volume. These flexible pallets need to be handled upon pallet support surfaces which give fairly uniform support over the entire area of the pallet. Conventionally, surfaces or mats of rollers, inverted casters, or balls are used to support and facilitate the transfer of loaded pallets.

One of the conventional techniques in transporting loaded pallets between a cargo terminal and aircraft utilizes pallet trailers or dollies having a pallet supporting transfer surface. These dollies are usually towed by a tractor in a train to the area of the aircraft where an aircraft loader has been positioned at the cargo hatch for elevating pallets to the level of the aircraft cargo deck. The dollies are maneuvered by hand into a position adjacent the loader, and the pallet is manually pushed from the transfer surface of the dolly to the transfer surface of the loader. The loader transfer surface then elevates, and the pallet is moved on into the aircraft. Unloading operations are a reversal of these steps. This conventional system has a major disadvantage in requiring manual positioning of the dollies and manual transfer of pallets off the dolly. These tasks are under certain conditions extremely difficult physically, and the technique requires the availability of the several personnel to do this handling.

An alternative conventional pallet handling technique utilizes self-powered transporters instead of dollies. The transporters customarily have a powered pallet transfer surface to accommodate one pallet, and they are of course maneuverable to effect alignment with the loader. Although this system avoids certain of the disadvantages of the dolly system, the transporter must make a trip to the terminal for each pallet, and the system does not provide any cargo load storage capacity as the plurality of dollies inherently do. Therefore, since the transporter is a much more expensive piece of equipment than the pallet dollies, this system is not practical for aircraft loading operations at any distance from the terminal.

SUMMARY OF THE INVENTION

It is a primary object of the present invention to provide a pallet handling technique which avoids the disadvantages of the prior art systems. This object is accomplished by utilization of pallet dollies which are uniquely constructed so that, in conjunction with cooperating structure on an aircraft loader and on a tractor, the dolly may be accurately aligned with the loader and its pallet transferred therebetween without manual handling. Specifically the dolly is provided with a transfer surface of interconnected palletcontacting wheels or rollers with an end drive roller exposed to be frictionally, engaged so as to activate the remaining dolly rollers. To cooperate with the exposed roller, the loader has an extractor roller or wheel located to engage the end roller of the dolly when it is positioned adjacent the loader. In the embodiment illustrated, the extractor wheel is powered and may be selectively actuated. In this manner a pallet may be transferred between the loader and the unpowered dolly under power supplied by the loader. Further, the dollies have a side hitch positioned to cooperate with a side-mounted hitch on a tow tractor so as to secure the dolly to the tractor in a fixed side-by-side relationship. As dollies generally have fixed rear wheels, as do most tractors, the side hitch is constructed to align the rear wheel axis of the dolly with the rear wheel axis of the tractor whereby the rigid combination of the two vehicles may be turned as a unit.

Further objects of the present invention will become apparent from the following description and appended claims when read in conjunction with the accompanying drawings.

BRIEF DESCRIPTION OF THE DRAWINGS

FIG. 2 is an enlarged top view of the components of the present invention positioned at the cargo hatch of an aircraft.

FIG. 3 is a perspective view of the apparatus of FIG. 2.

FIG. 4 is a partially sectioned top view of the tractor and dolly of the present invention particularly showing the side-hitch arrangement therebetween.

FIG. 5 is a vertical section taken substantially on line 5—5 of FIG. 3 and shows the extractor mechanism of the aircraft loader.

FIG. 6 is a vertical section taken substantially on line 6—6 of FIG. 4 and shows the side-by-side hitch between the tractor and dolly.

DESCRIPTION OF THE INVENTION

Figure 1:
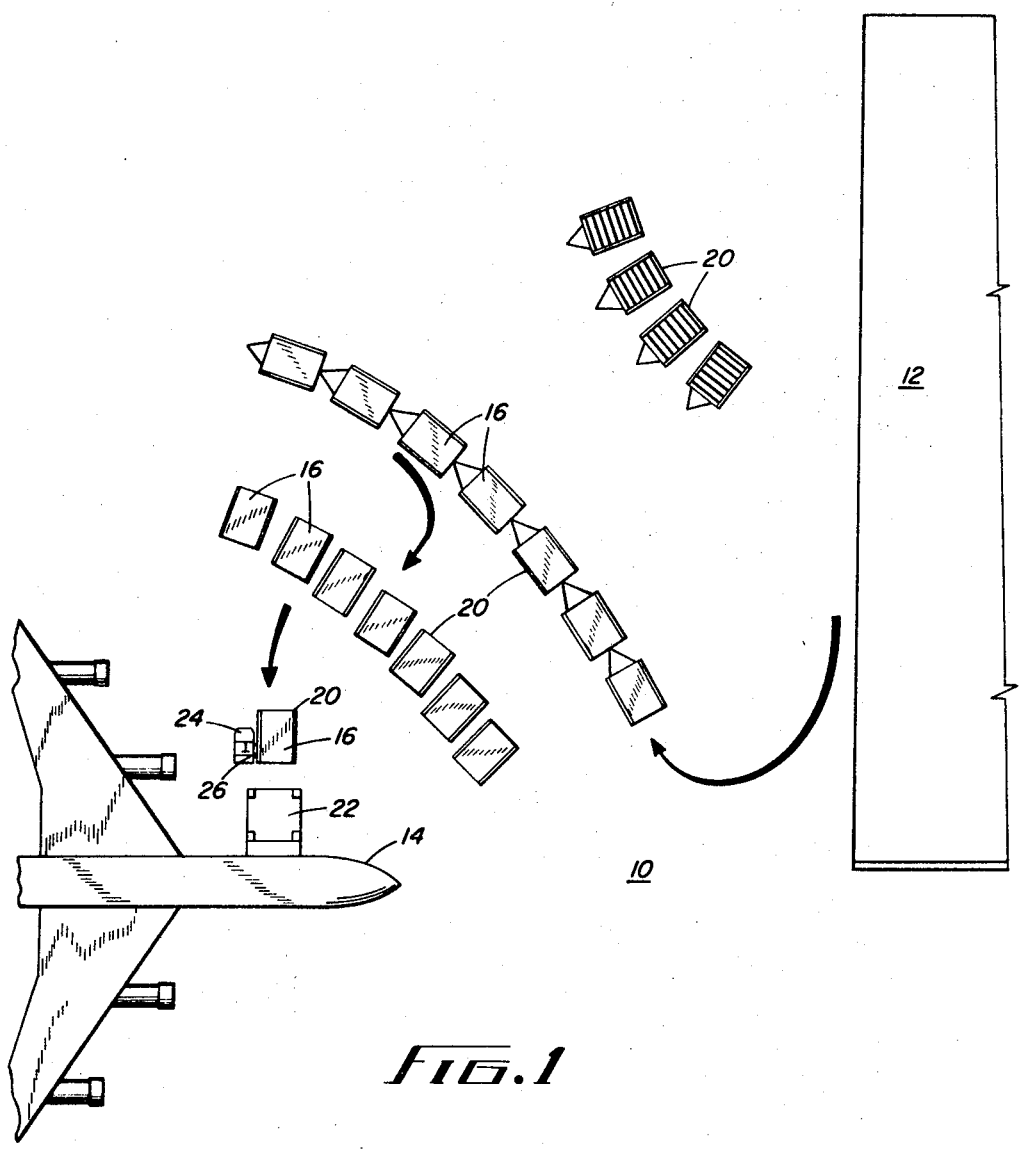
FIG. 1 is a top view of an aircraft terminus illustrating the pallet handling techniques of the present invention.

Referring to the drawings generally, the invention is exemplarily shown in the environment of an aircraft terminus 10 having a terminal building 12 and serving as a loading and unloading point for aircraft 14. Each aircraft is capable of carrying cargo loaded pallets 16 which are inserted into the aircraft through a hatch 18 (FIG. 2). The present invention provides improved techniques for handling the pallets between the terminal and the aircraft. The invention utilizes pallet trailers or dollies 20 to carry the loaded pallets 16 between the aircraft area and terminal building 12. A uniquely adapted aircraft loader 22 is positioned adjacent aircraft hatch 18 and remains there during an aircraft unloading and/or loading operation. The aircraft loader functions to elevate and transfer loaded pallets between the relatively low level of dollies 20 and the conventionally elevated position of aircraft cargo decks. A tractor 24 having a novel side-mounted hitch 26 for detachable rigid side-by-side engagement with successive dollies is used to controlledly maneuver each dolly into alignment with the loader for pallet transfer.

Considering the respective elements of the invention in greater detail, dollies 20 include a generally rectangular frame 30 (FIG. 3) having ground engaging wheels 32 and 34. Rear wheels 32 of the dollies are fixed whereas the front wheels 34 are swivel casters. Frame 30 of the dolly has a draw bar 36 at the front and a pintle (not shown) at the rear to permit the dollies to be assembled in a conventional train for towing. Draw bar 36 pivots to a raised storage position in which it is out of the way during dolly maneuvering.

The dollies include a pallet supporting mat or transfer surface made up of a number of individual wheels or rollers 38. As exemplarily illustrated, rollers 38 extend the full width of the dolly and have shafts 40 (FIG. 4) extending into a box beam 42 of the dolly frame wherein the rollers are interconnected by chain sprockets 44 and drive chains 46 so that when one roller turns the interconnected remaining rollers of the dolly surface turn in the same direction. The shaft of one of the rollers extends through frame 30 and into a ratchet mechanism 50 located at a convenient location for operation from tractor 24. Ratchet mechanism 50 is a conventional piece of hardware and as the detail thereof forms no part of this invention it is not disclosed in detail. As conventional in such mechanisms, a two-position manual control handle 52 operates the mechanism so that in one position the associated roller 38, and hence the whole roller surface, is free to rotate so as to roll a pallet rearwardly off the dolly (toward the left in FIG. 2), whereas in the other position of the ratchet mechanism the rollers 38 are only free to roll a pallet forward onto the dolly (toward the right in FIG. 2). At the front of the dollies, fixed pallet stops 56, extend up above the roller surface to prevent pallets from moving off the front end of the dolly. Thus, pallet stops 56 and ratchet mechanism 50, when in its onloading position, secured a pallet from either forward or rearward movement off the dolly.

The self-powered mobile loader 22 is provided with an operator's station 60, an aircraft loading bridge 62, elevator posts 64, an elevator platform 66, and an extractor mechanism 68. Both bridge 62 and elevator platform 66 are provided with a low-friction pallet supporting surface, preferably omnidirectional, such as inverted casters or ball supports 72. Additionally, elevator platform 66 is provided with powered rollers 74 and powered wheels 76 which frictionally engage the underside of the pallet on the loader and which may be selectively driven to move a pallet either forward or aft on the loader.

Extractor mechanism 68, as shown in FIG. 5, includes a power source such as hydraulic motor 80 mounted within the rear frame member 82 of the loader. Motor 80 drives friction contact rollers or wheels 84 by a chain drive 86. When a dolly is backed into position adjacent the loader, the rear roller 38 of the dolly is frictionally engaged by extractor wheels 84 which can then be selectively driven in either direction to drive the entire interconnected surface on the dolly to transfer a pallet between the dolly and the loader.

Referring now to the side-by-side hitch 26 between tractor and dolly, the tractor mounted portion of the hitch includes a longitudinally extending beam 92 (FIGS. 4 and 6) rigidly secured to tractor 24. A dolly engaging pin 94 in the form of an angle is rigidly welded to beam 92 and depends therefrom. The beam 92 is provided with front and rear slots 96 and 98 to accommodate a vertically extending locking bar or pin 100. A reinforcing plate 102 is welded to engaging pin 94 and beam 92, and is also provided with a slot 104 aligned with slot 96.

In order to mate with the hitch components on the tractor, dollies 20 are provided with abutment pads 106 and 108 positioned along one side of the dolly frame 30. Intermediate abutment pads 106 and 108, a lug 110 in the form of a Z-shaped member is mounted on a pad 112 in a position to be engaged by pin 94 on the tractor.

To engage a dolly, tractor 24 approaches the dolly from the rear (from the right in FIG. 4) with beam 92 closely adjacent or grazing pads 106 and 108. Locking pin 100 is at this time positioned in a stored inoperative position in slot 98 to the rear of engagement pin 94. Therefore, as the tractor moves forward along the side of the dolly, the Z-shaped lug 110 of the dolly which protrudes out below beam 92 on the tractor can be engaged by the depending pin 94. Locking pin 100 is then manually moved by the tractor operator from its stored position to its operative locking position extending down through slots 96 and 104 in front of the intermediate leg 114 of lug 110. Thus, with the hitch elements in the position shown in FIG. 4 and FIG. 6, the dolly is restrained from pivoting or moving forward, rearward, or away with respect to the tractor.

The engagement pads 106 and 108 as well as the "Z" lug 110 are positioned along dolly frame 30 so that the axis 116 of fixed rear wheels 32 of the dolly is vertically aligned with the axis of the rear wheels 118 of the tractor. In this manner it is possible for the dolly and tractor to maneuver as a unit with the swivel front wheels 34 of the dolly following the steering motions of the front end of the tractor. Because of the proximity of the tractor operator to the rear of the dolly and because of the resulting good visibility of the rear roller, the present invention greatly facilitates the alignment of the dolly with the loader and a proper frictional engagement with the extractor.

The operation of the present invention is indicated by the flow arrows in FIG. 1. A train of loaded dollies is assembled near terminal building 12 and is towed to the vicinity of the aircraft to be loaded by tractor 24 in conventional manner. At the aircraft the train is broken up, the dollies are positioned for convenient successive engagement by the tractor, and the dolly draw bars are raised to their stored positions. When the aircraft is ready for loading, tractor 24 engages each dolly in turn and maneuvers it to an aligned position at the loader with the back roller of the dolly forced into contact with friction drive wheels 84 of the extractor on the loader. The extractor is actuated to operate the interconnected roller mat of the dolly so as to transfer a loaded pallet from the dolly to elevator platform 66 of the loader. This pallet is then elevated for transfer into the aircraft while the tractor parks the now empty dolly and engages the next dolly for loading. A similar but reverse sequence of operations is utilized for off loading.

As this invention may be embodied in several forms without departing from the spirit or essential characteristics thereof, the present embodiment is illustrative, with the scope of the invention being defined by the appended claims rather than by the description preceding them.

We claim:

1. In an aircraft terminus system wherein cargo pallets are transported across the terminal floor by means of dollies to an aircraft cargo loader positioned at the aircraft entrance hatch, and whereby the pallets are thus transferred from the low level of the dollies to the high level of the aircraft entrance hatch, and vice versa, and wherein said dollies have an unpowered interconnected roller assembly forming a pallet supporting surface, with said rollers extending transversely of the longitudinal axial direction of the dolly, a loader which comprises, a. a self-powered wheeled vehicular frame structure stationed with its front end adjacent to said aircraft entrance hatch, b. an elevatable transfer loading platform mounted on said frame structure, adapted to receive across one side thereof pallets from said dollies when positioned adjacent to said one side, and the said platform is in its lower level position, c. and a pallet extractor wheel provided upon said one side of the frame structure, power driven from the loader for rotation about an axis parallel to said one side of the frame structure, and adapted to drivingly engage the end roller of said interconnected assembly of rollers on the dolly, when the respective end thereof is positioned adjacent and substantially parallel to said one side of the frame structure, permitting transfer of a pallet between such dolly and said transfer platform of the loader when power is applied to the extractor wheel from the loader.

2. The loader according to claim 1, with the addition of an elevated auxiliary platform structure mounted upon the front end of said frame structure, bridging a gap between the elevated loading platform and the hatchway floor, and means for raising or lowering said auxiliary platform structure to the level of the elevated loading platform.

3. The loader according to claim 1, wherein the extractor wheel is provided upon the rear end of said frame structure.

* * * * *